(12) United States Patent
Barel

(10) Patent No.: US 12,314,475 B1
(45) Date of Patent: May 27, 2025

(54) COMPUTING DEVICE WITH HAPTIC TRACKPAD

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/651,415

(22) Filed: Apr. 30, 2024

(51) Int. Cl.
*G06F 3/01* (2006.01)
*G06F 3/16* (2006.01)
*H04R 1/02* (2006.01)

(52) U.S. Cl.
CPC .............. *G06F 3/016* (2013.01); *G06F 3/165* (2013.01); *H04R 1/028* (2013.01)

(58) Field of Classification Search
None
See application file for complete search history.

(56) References Cited

U.S. PATENT DOCUMENTS

| 10,649,529 | B1* | 5/2020 | Nekimken | G06F 1/1688 |
| 11,755,154 | B1* | 9/2023 | Zhang | G06F 3/0418 |
| | | | | 345/173 |
| 2017/0249012 | A1 | 8/2017 | Taylor | |
| 2019/0073036 | A1 | 3/2019 | Bernstein | |
| 2021/0240267 | A1 | 8/2021 | Gajiwala | |
| 2021/0240271 | A1 | 8/2021 | Gajiwala | |
| 2021/0240283 | A1 | 8/2021 | Knoppert | |
| 2021/0375564 | A1 | 12/2021 | Porcella | |
| 2022/0129121 | A1 | 4/2022 | Karunamuni | |
| 2022/0365601 | A1 | 11/2022 | Zhao et al. | |
| 2023/0350494 | A1* | 11/2023 | Sathe | G06F 3/0418 |

OTHER PUBLICATIONS

"Change Trackpad settings on Mac", Apple, 2023, 5 pages.
"Collaboration Touchpad Reference Guide", Dell Technologies, Oct. 2023, 9 pages.

\* cited by examiner

*Primary Examiner* — Stephen T. Reed
(74) *Attorney, Agent, or Firm* — Alleman Hall & Tuttle LLP

(57) ABSTRACT

A computing device comprises a microphone, a trackpad, and a haptic actuator coupled to the trackpad. A memory stores instructions executable by a processor to drive the haptic actuator with a driving signal to generate a first trackpad sonic output. The first trackpad sonic output is measured using a signal from the microphone of the computing device. A sonic variance is determined by comparing the first trackpad sonic output to a target trackpad sonic output. The sonic variance is used to adjust the driving signal for the haptic actuator to an adjusted driving signal. The haptic actuator is driven with the adjusted driving signal to cause a second trackpad sonic output from the trackpad different from the first trackpad sonic output.

20 Claims, 6 Drawing Sheets

COMPUTING DEVICE WITH HAPTIC TRACKPAD

BACKGROUND

Some computing devices include a trackpad for receiving user inputs. In some of these devices, the trackpad is coupled to haptic components that are configured to generate vibrations in the trackpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to methods and computing devices for adjusting a driving signal for a haptic trackpad in a computing device. In some examples, a computing device comprises a microphone, a trackpad, and a haptic actuator coupled to the trackpad. The haptic actuator is driven with a driving signal to generate a first trackpad sonic output. The first trackpad sonic output is measured using a signal from the microphone of the computing device. A sonic variance is determined by comparing the first trackpad sonic output to a target trackpad sonic output. The sonic variance is used to adjust the driving signal for the haptic actuator to an adjusted driving signal. The haptic actuator is driven with the adjusted driving signal to cause a second trackpad sonic output from the trackpad different from the first trackpad sonic output.

As described in more detail below, and in one potential advantage of the present disclosure, this closed-loop process of measuring trackpad sonic outputs with the device microphone and adjusting the driving signal accordingly can be periodically and selectively performed over the life of the computing device. In this manner, configurations of the present disclosure can provide on-going calibration of the trackpad's sonic and haptic output over the useful life of the computing device to account for changes in the mechanical properties of the trackpad and/or other components and structures of the computing device.

In some examples and as described further below, based at least on the determined sonic variance, a speaker of the computing device or a separate speaker is actuated to generate a speaker sonic output. In these examples and another potential advantage of the present disclosure, when the sonic variance meets one or more predetermined criteria, configurations of the present disclosure utilize a speaker to generate speaker sonic output. In some examples, the speaker sonic output can substantially match a target trackpad sonic output. In other examples described further below and another potential advantage of the present disclosure, based at least on the determined sonic variance, a second haptic actuator in another device separate from the computing device is caused to generate a separate device haptic output. Advantageously, when the sonic variance meets one or more predetermined criteria, these configurations utilize haptic actuators in devices separate from the computing device housing the trackpad to provide haptic and/or sonic output to a user.

DETAILED DESCRIPTION

Figure 1:
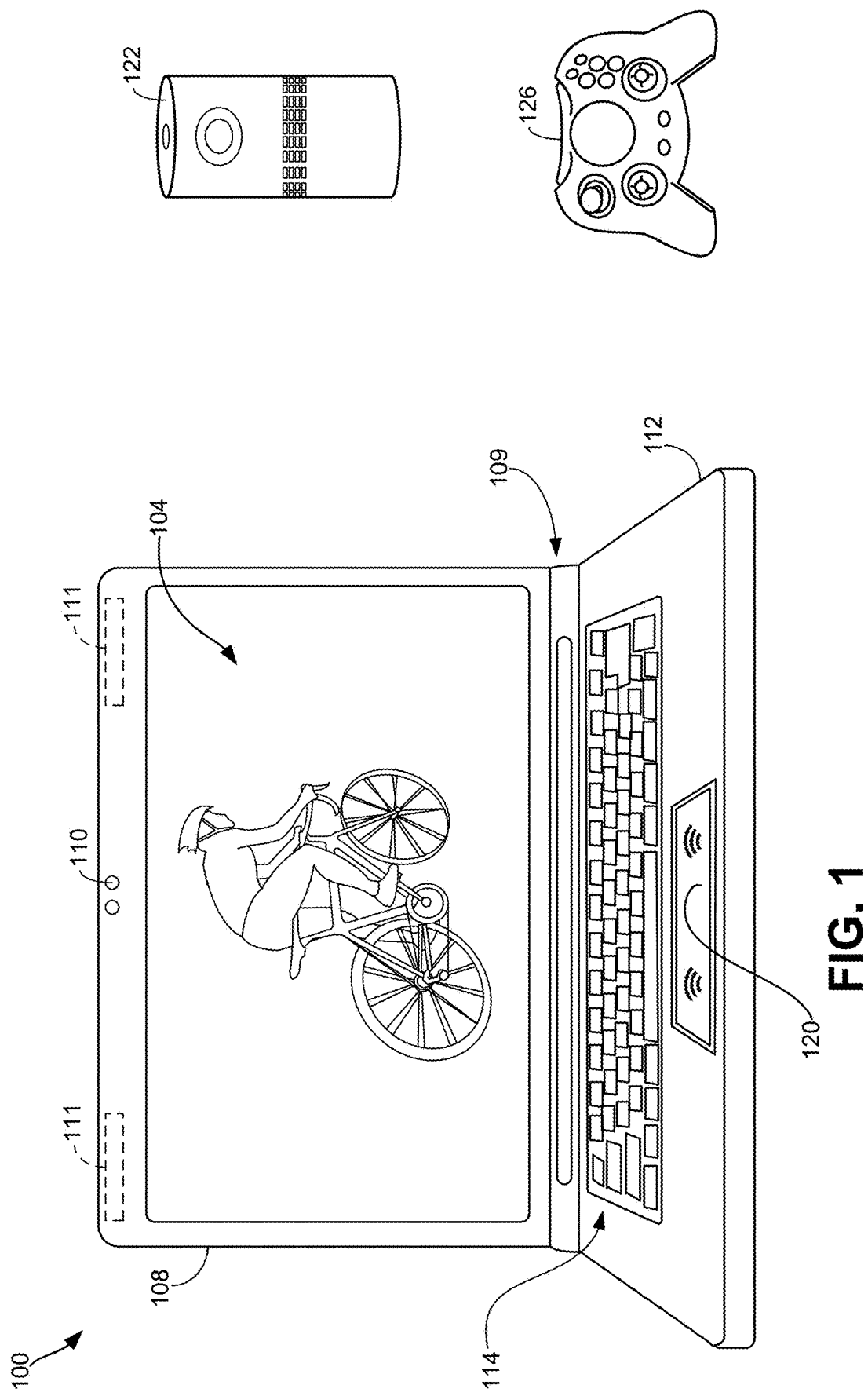
FIG. 1 shows one example of a computing device with a haptic trackpad along with a separate speaker and gaming device according to examples of the present disclosure.

Some computing devices include a trackpad for receiving user inputs. In some of these devices, the trackpad is coupled to one or more haptic components that are configured to generate vibrations in the trackpad. For example, in some devices one or more conductive coils, linear resonant actuators (LRAs), or other haptic components are coupled to the trackpad and configured to vibrate the trackpad to provide haptic feedback to a user. Such vibrations can also produce audible sounds in the form of sonic output from the trackpad.

Over time, the mechanical properties of the trackpad and/or computing device components can change and alter the performance of the haptic trackpad and the corresponding vibrations sensed and/or the sonic output heard by the user. For example, mechanical changes over the life of a computing device can change the sonic and haptic feedback produced by the trackpad and experienced by the user. Such changes can include, but are not limited to, deformations and material property changes (such as stiffness) in one or more trackpad components, haptic actuators, and other computing device components. In some examples, fasteners and/or other retention features of the haptic actuator components can loosen with use over time. In some examples, sudden impacts experienced by the computing device and/or changing environmental conditions, such as temperature and relative humidity, also can cause changes in mechanical properties of the computing device. Additionally, and in some examples, in the manufacturing process variations in assembly and/or components of the computing devices can result in different mechanical and structural properties among different devices.

In any of the preceding examples, changes in the device's mechanical properties can result in changes to the mechanical resonance properties of the trackpad. Such resonance changes can alter the sonic output and haptic feedback generated by the trackpad, thereby creating a varying and inconsistent sonic and haptic experience for the user. Further, dropping the device or otherwise subjecting the device to sudden forces or exterior contacts can loosen fasteners and/or cause other unintended structural changes in the device that change the trackpad's sonic and haptic output.

Accordingly, and as described in more detail below, configurations of the present disclosure provide computing devices and methods for adjusting a driving signal for a haptic trackpad in a computing device, utilizing one or more speakers of the computing device or a separate device to provide speaker sonic output, and/or utilizing another haptic actuator in a separate device to provide separate sonic and haptic feedback. More particularly, by utilizing one or more microphones integrated in the computing device along with a closed-loop feedback process as described below, computing devices of the present disclosure can adjust the haptic actuator driving signal to provide on-going calibration of the sonic and haptic output produced by a haptic actuator over the lifetime of the product. In some examples, a speaker of the computing device, a separate speaker of another device, and/or a haptic component of a separate device can be utilized to provide feedback. Advantageously, by continually adjusting the driving signal and/or utilizing other components to provide feedback, the computing device can produce or cause to be produced consistent sonic and haptic output, even as mechanical properties of the device change over time.

With reference now to FIGS. 1-4 and 6, an example computing device 100 in the form of a laptop computer is illustrated. In other examples, aspects of the present disclosure can be implemented in tablet computing devices, foldable computing devices, wearable and other mobile computing devices, and any other type of computing device that utilizes a haptic trackpad and microphone.

Computing device 100 includes a display 104 on a display substrate 108 that is rotatably coupled at a hinge 109 to a chassis 112. In this example a microphone 110 and two speakers 111 are also provided in display substrate 108. The chassis 112 includes a trackpad 120 and a keyboard 114 mounted therein. In different examples a user provides touch inputs to the trackpad 120 by touching the trackpad with portions of the user's body, such as more digits of the user's hand. As described in more detail below, the trackpad 120 includes a haptic actuator 124 (see FIG. 2) that is actuated to generate sonic and haptic output. In one potential advantage of the present disclosure, by using a signal from the microphone to compare trackpad sonic outputs to a target trackpad sonic output, the computing device can adjust a driving signal for the haptic actuator to an adjusted driving signal that generates trackpad sonic output that more closely approximates the target trackpad sonic output. In some examples and as described further below, the speaker of the computing device can be utilized to generate a speaker sonic output in addition to or instead of a trackpad sonic output. And in other examples described below, another device can be utilized to generate haptic output and/or sonic output in addition to or instead of haptic and sonic output from the trackpad of the computing device.

In the present example, trackpad 120 is configured to detect the position and movement of a user's finger(s) and/or thumb and translate such position/movement to a relative position on the display 104. In some examples, the trackpad 120 can include a force sensor, such as a strain gauge or piezoelectric device, that is configured to determine a touch force exerted by a user's finger(s) and/or thumb on the trackpad. In other examples where touch detection algorithms of the computing device 100 are also configured to measure force, such algorithms can determine the touch force exerted by a user's finger(s) and/or thumb on the trackpad 120 and discrete force sensing components are not required.

In some examples, the trackpad 120 is a mutual capacitance trackpad. In these examples, touch inputs are identified by sampling capacitance between a driving electrode and a sensing electrode. Driving electrodes are arranged in an array within the trackpad 120. Touch detection signals are provided to each of the electrodes at a different frequency and/or at a different time. Grounded conductive materials, such as a user's finger, draw electric field lines away from sensing electrodes when providing a touch input. This results in a lower capacitive coupling between driving and sensing electrodes. Such lower capacitive coupling is measured by a touch sensing processor as a lower current flow from the driving electrode to sensing electrode. A location of the touch input can be reconstructed based at least in part on determining which driving electrodes were being driven when the touch input occurred, and the frequency of the touch detection signal driving each driving electrode. In other examples, the principles of the present disclosure may be utilized with trackpads employing other touch detection technologies, including but not limited to self-capacitance and projected capacitance touch detection.

Figure 2:
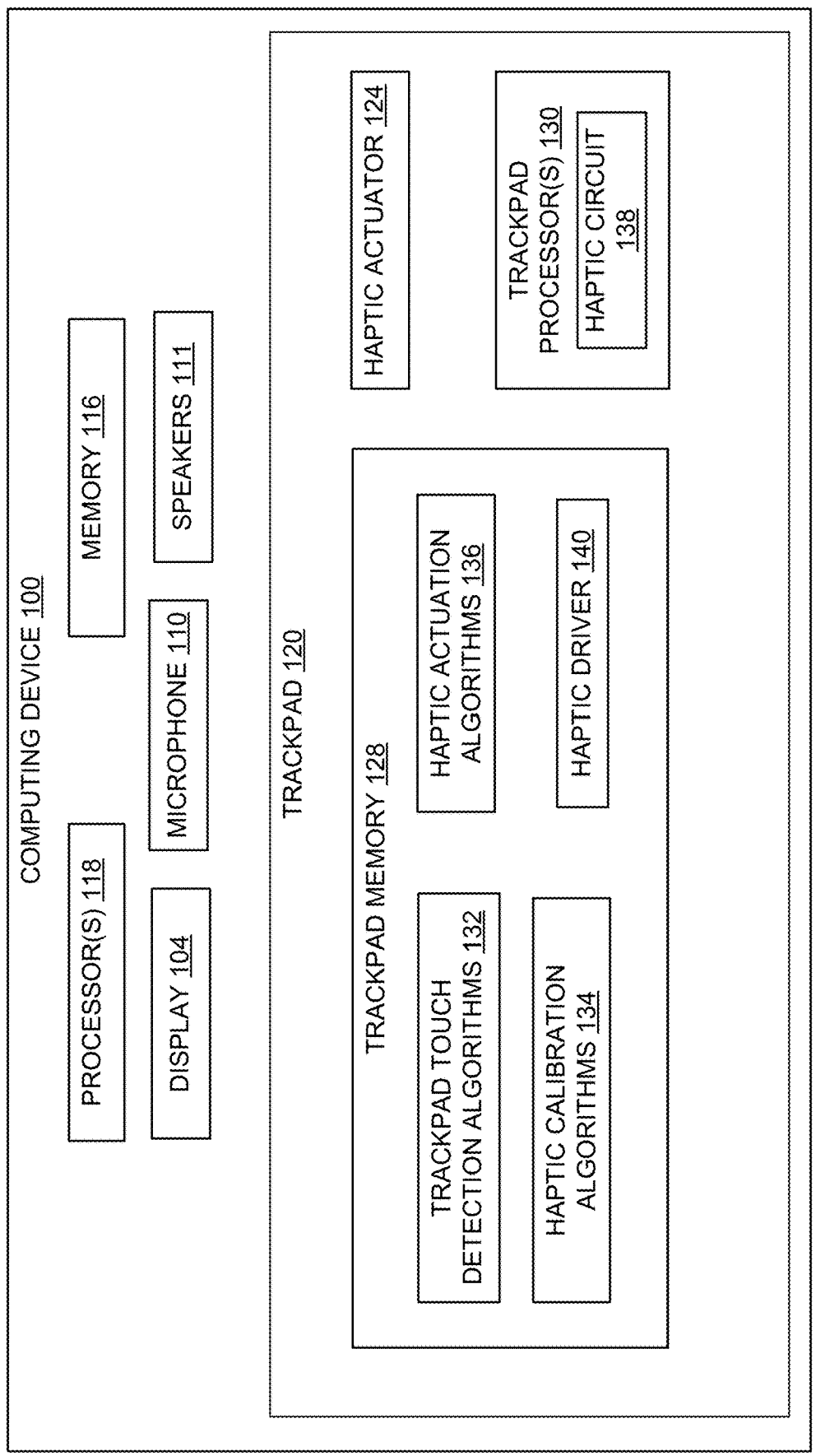
FIG. 2 shows a schematic view of components of the computing device of FIG. 1 according to examples of the present disclosure.

With reference now to FIG. 2, a schematic view of components of one example of the computing device of FIG. 1 is provided. Computing device 100 includes memory 116 that stores instructions executable by a processor 118. Such instructions can include an operating system and one or more applications. In the present example, the trackpad 120 comprises a trackpad memory 128 that stores instructions executable by a trackpad processor 130. For example, the trackpad memory 128 stores instructions in the form of trackpad touch detection algorithms 132 executable by the trackpad processor 130 to perform touch detection on the trackpad 120 using signals received from the trackpad.

Additionally, and as described in more detail below, trackpad memory 128 stores instructions in the form of haptic calibration algorithms 134 executable by the trackpad processor 130 to receive and process signals from the microphone 110, determine a sonic variance with respect to a target trackpad sonic output, and use the sonic variance to adjust driving signals for the haptic actuator 124. Haptic actuation algorithms 136 are executed by the trackpad processor 130 to drive the haptic actuator with the adjusted driving signals. For example, in some examples the trackpad processor 130 includes a haptic circuit 138 configured to execute a haptic driver 140 that controls activation of the haptic actuator 124.

In other examples, the haptic circuit 138 is located on processor 118. In some examples, one or more of the trackpad touch detection algorithms 132, haptic calibration algorithms 134, haptic actuation algorithms 136, and haptic driver 140 are stored in memory 116 and executed by processor(s) 118 of computing device 100. In some examples, the trackpad 120 includes the haptic actuator 124 and does not include a dedicated memory or processor. Additional details regarding processor(s) 118, trackpad processor(s) 130, memory 116, trackpad memory 128, and other components and subsystems of computing device 100 and trackpad 120 are described further below with reference to FIG. 6.

Figure 3:
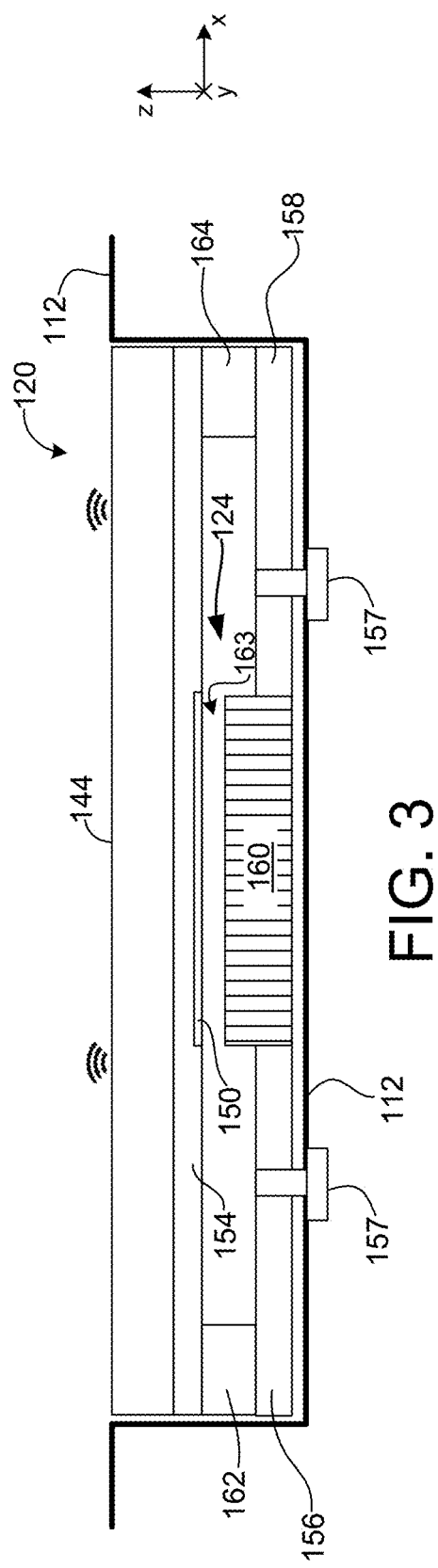
FIG. 3 shows a schematic view of components of the trackpad and haptic actuator of the computing device of FIG. 1 according to examples of the present disclosure.
Figure 4:
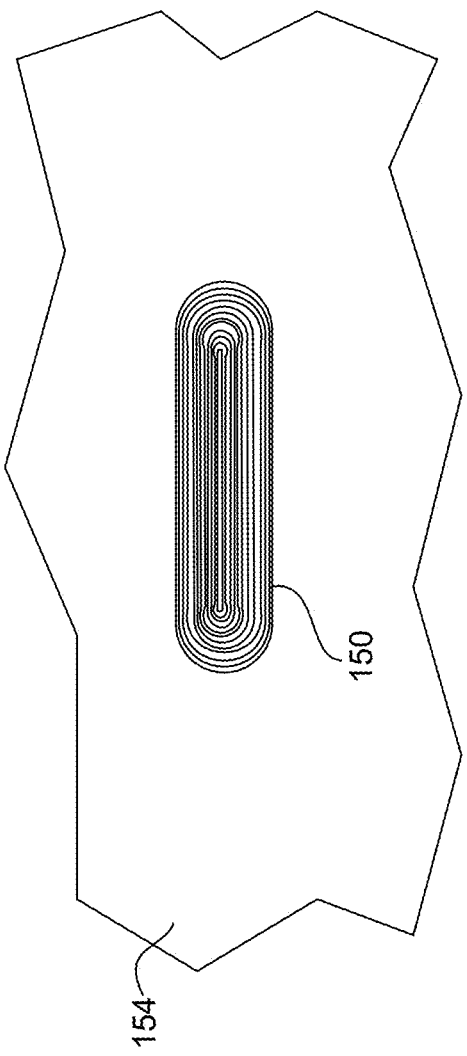
FIG. 4 shows a partial schematic view of a conductive coil located in a printed circuit board of the haptic actuator of FIG. 3 according to examples of the present disclosure.

In some configurations of the present disclosure, the haptic actuator 124 comprises one or more conductive coils formed on or affixed to a printed circuit board of the trackpad, and one or more magnets mounted adjacent to the conductive coil(s). With reference now to FIGS. 3 and 4, in one example the trackpad 120 includes a touch surface 144, such as a glass layer. Beneath the touch surface 144 is a printed circuit board 154 comprising driving and sensing electrodes as described above.

In this example, the printed circuit board 154 is affixed to a first mounting plate 156 and second mounting plate 158 via a first spacer 162 and second spacer 164, respectively. In some examples, the first spacer 162 and second spacer 164 comprise a resilient, dampening material to mechanically isolate the trackpad 120 and dissipate the transmission of forces and other mechanical energy between the trackpad 120 and the chassis 112. For example, the first spacer 162 and second spacer 164 may comprise an elastomeric material, such as rubber or any other suitable material. The first mounting plate 156 and second mounting plate 158 are coupled to the chassis 112 by fasteners 157, such as screws.

With reference also to FIG. 4, the haptic actuator 124 comprises a conductive coil 150 that is formed on the printed circuit board 154. In other examples, the conductive coil 150 may be a discrete coil module that is affixed to the surface of the printed circuit board 154. In other examples, two or more conductive coils may be utilized.

The conductive coil 150 and is formed of a conductive material. Examples of conductive materials include various metals, such as aluminum, gold, silver, and copper. The conductive coil 150 in this example is planar in structure. More particularly, the conductive coil 150 is relatively thin as compared to its length and width to provide a relatively flat structure. In the present example, the conductive coil 150 is formed by a conductive line tracing a planar spiral pattern with a progressively larger distance from the center portion of the coil to its outer edge.

The conductive coil(s) can be formed on the printed circuit board 154 in any suitable method, such as a masking technique, via deposition and etching of a conductive film on the printed circuit board, or via 3-dimensional printing techniques. In other examples, a pre-formed conductive coil can be affixed to the printed circuit board 154 by any suitable method, including gluing.

As shown in FIG. 3, in this example the haptic actuator 124 includes a magnet 160 that is affixed to the first mounting plate 156 and second mounting plate 158. In this example, the magnet 160 is spaced from the conductive coil 150 to form a gap 163 between the magnet and the coil and printed circuit board 154. In this configuration, the haptic circuit 138 executes the haptic driver 140 to generate and deliver a driving signal to the conductive coil 150. The driving signal is controlled to generate electromagnetic fields that exert magnetic forces on the magnet 160 and corresponding forces on the conductive coil 150 and attached printed circuit board 154 and touch surface 144 of the trackpad 120. More particularly, in this example Lorentz forces operate to vibrate the touch surface 144 laterally in the x-y plane and thereby generate trackpad sonic output and provide haptic feedback to one or more digits of a user contacting the touch surface.

As noted above, the mechanical properties of a trackpad and/or computing device components can change over time, thereby altering the performance of the haptic trackpad and its corresponding sonic and haptic output. For example, fasteners and other structural components, such as first and second mounting plates 156, 158 and fasteners 157, may loosen, deform, or otherwise change over time with repeated use of the computing device. These changes can result in undesirable changes in the mechanical resonance properties of the trackpad. Such resonance changes can correspondingly create a varying and inconsistent sonic and haptic experience for the user.

Accordingly, and as described further below, configurations of the present disclosure utilize one or more microphones integrated in the computing device along with a closed-loop feedback process to provide on-going calibration of the sonic and haptic output produced by a haptic actuator over the lifetime of the product. Advantageously, by continually adjusting the driving signal in this manner, the computing device can produce consistent sonic and haptic output, even as mechanical properties of the device change over time.

Figure 5A:
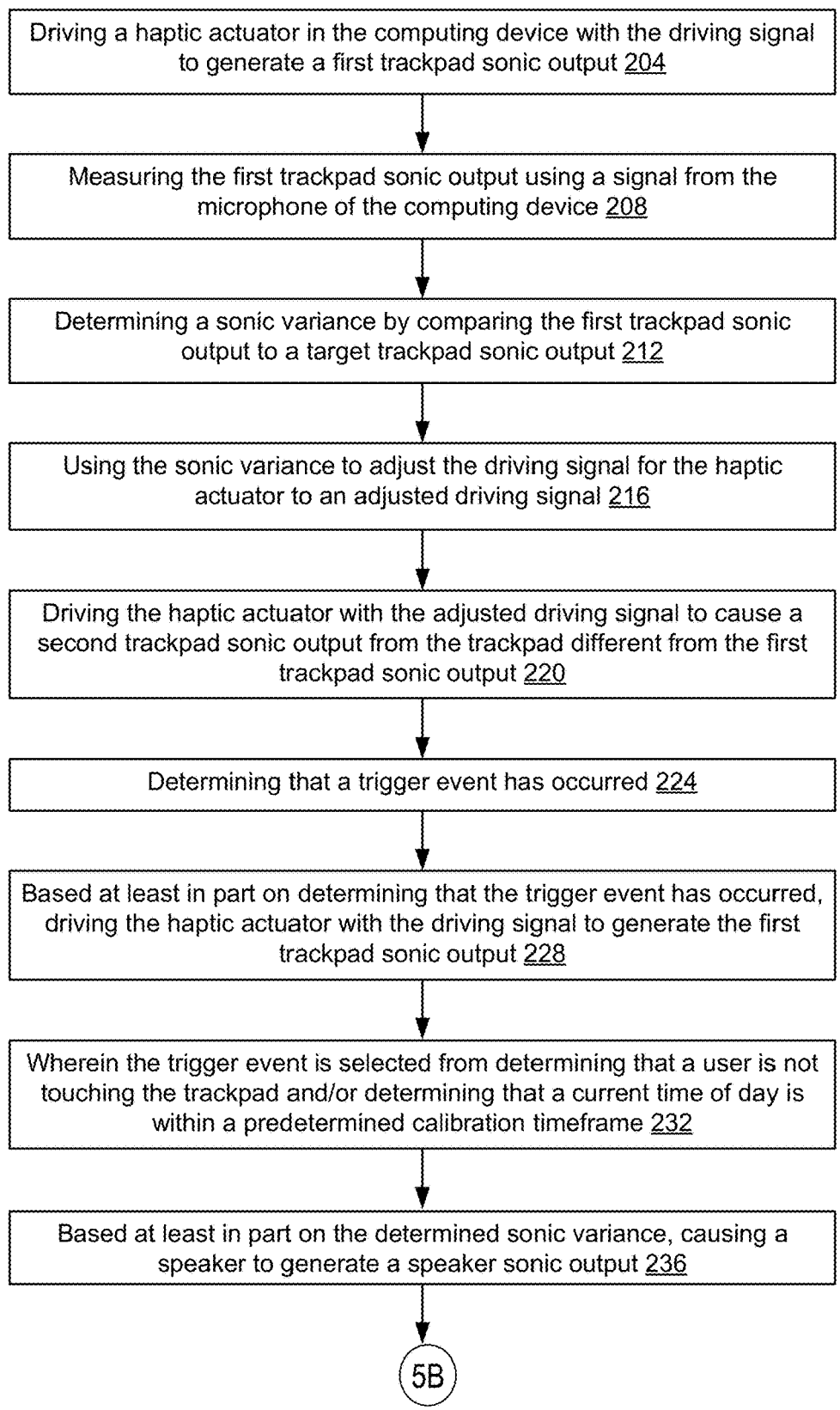
FIGS. 5A and 5B show a flow diagram of an example method for adjusting a driving signal for a haptic trackpad in a computing device according to examples of the present disclosure.
Figure 5B:
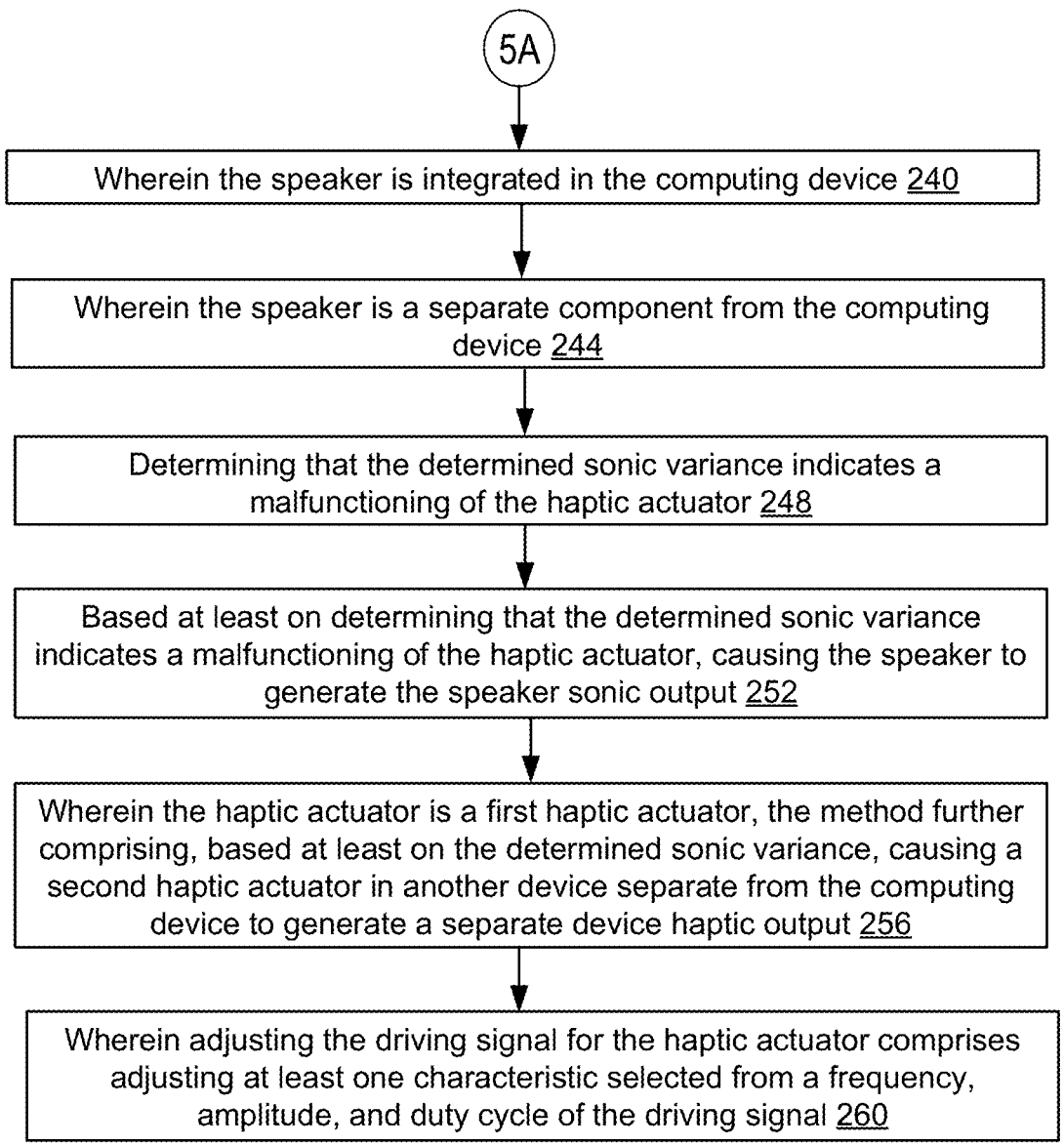

With reference now to FIGS. 5A and 5B, an example method 200 for adjusting a driving signal for the haptic trackpad 120 in computing device 100 will now be described. FIGS. 5A and 5B depict a flowchart illustrating method 200. The following description of method 200 is provided with reference to the software and hardware components described herein and shown in FIGS. 1-4 and 6. For example, method 200 may be performed by the computing device 100, hardware, software, and/or firmware of the computing device 100.

It will be appreciated that the following description of method 200 is provided by way of example and is not meant to be limiting. Therefore, it is to be understood that method 200 may include additional and/or alternative steps relative to those illustrated in FIGS. 5A and 5B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in a variety of other computing devices having different form factors, components, and/or capabilities, and in other contexts using other suitable components.

With reference to FIG. 5A, at 204 the method 200 includes driving the haptic actuator in the computing device with a driving signal to generate a first trackpad sonic output. At 208 method 200 includes measuring the first trackpad sonic output using a signal from the microphone 110 in the computing device 100. At 212 method 200 includes determining a sonic variance by comparing the first trackpad sonic output to a target trackpad sonic output. As described further in use case examples below, at 216 method 200 includes using the sonic variance to adjust the driving signal for the haptic actuator 124 to an adjusted driving signal. At 220 method 200 includes driving the haptic actuator 124 with the adjusted driving signal to cause a second trackpad sonic output from the trackpad 120 different from the first trackpad sonic output. In some examples, the second trackpad sonic output from the trackpad 120 is measured via the microphone 110 and compared to the target trackpad sonic output, the resulting sonic variance is used to adjust the adjusted driving signal, and this process is repeated until the sonic variance is determined to be within a sonic output tolerance range.

In different examples, one or more aspects, waveform characteristics, and/or other features of the trackpad sonic output can be measured and compared to corresponding aspects, characteristics, and/or features of the target trackpad sonic output to determine the sonic variance. Examples of such aspects, waveform characteristics, and/or other features of the trackpad sonic output include, but are not limited to, decibel level, frequency, and wavelength. In some examples the sonic variance can be used to determine whether to adjust the driving signal for the haptic actuator 124. In some examples the sonic variance can be used to determine the magnitude and manner in which to adjust the driving signal.

Advantageously and as described in more detail below, by performing these steps periodically using the device's microphone in a closed-loop process, the haptic calibration algorithms 134 can continually adjust the driving signal to generate trackpad sonic output more closely approximating the target sonic output, thereby enabling the computing device to produce consistent sonic output even as mechanical properties of the device change over time.

In some examples, this calibration process can be initiated in response to one or more trigger events that are determined by computing device 100. With reference again to FIG. 5A, at 224 method 200 includes determining that a trigger event has occurred. At 228 method 200 includes, based at least in part on determining that the trigger event has occurred, driving the haptic actuator with the driving signal to generate the first trackpad sonic output. A variety of different trigger events can be utilized to initiate the calibration processes described herein. In some examples and at 232, method 200 includes wherein the trigger event comprises determining that a user is not touching the trackpad and/or determining that a current time of day is within a predetermined calibration timeframe.

For example, haptic calibration algorithms 134 can monitor signals from the trackpad touch detection algorithms 132 to determine when a user is not touching the trackpad 120. At least on condition of determining that a user is not touching the trackpad 120, the haptic calibration algorithms 134 can cause the haptic actuation algorithms 136 to drive the haptic actuator 124 with the driving signal to generate the first trackpad sonic output, measure the first trackpad sonic output, and perform the other steps to adjust the driving signal for the haptic actuator as described above. In one potential advantage of this configuration, by adjusting the driving signal for the haptic actuator 124 when a user is not touching the trackpad 120, this configuration ensures that the calibration process does not interrupt a user's interactions with the trackpad, and that the trackpad's sonic and haptic output is calibrated prior to the user's next interaction.

In some examples, haptic calibration algorithms 134 can initiate the calibration process described herein during one or more predetermined calibration timeframes. For example, calibration algorithms 134 may be configured to initiate the calibration process in the early morning hours when a user is unlikely to be using the computing device 100. Accordingly, calibration algorithms 134 can monitor a time of day. At least on condition of determining that the time of day falls within a predetermined calibration timeframe, such as a particular time of day (e.g., 3:00 a.m.) or a window of time, the haptic calibration algorithms 134 can cause the haptic actuation algorithms 136 to drive the haptic actuator 124 with the driving signal to generate the first trackpad sonic output, measure the first trackpad sonic output, and perform the other steps to adjust the driving signal for the haptic actuator as described above. In one potential advantage of this configuration, by adjusting the driving signal for the haptic actuator 124 during a predetermined window of time, this configuration enables a user to schedule trackpad calibrations during periods when the computing device 100 is not in use, thereby avoiding interference with a user's interactions with the trackpad, and ensuring that the trackpad's sonic and haptic output is calibrated prior to the user's next interaction.

In some examples and use cases and as noted above, configurations of the present disclosure can utilize the speaker(s) 111 of the computing device 100 to generate a speaker sonic output in addition to or instead of a trackpad sonic output. And in other examples described below, another device can be utilized to generate haptic output and/or sonic output in addition to or instead of haptic and sonic output from the trackpad of the computing device. In one potential advantage of these configurations, utilizing a speaker of the computing device or a speaker or haptic component of a separate device to generate sonic and/or haptic output can supplement or replace sonic output from the trackpad of the computing device.

Accordingly, in some examples and with reference again to FIG. 5A, at 236 method 200 includes, based at least in part on the determined sonic variance between the first trackpad sonic output and the target trackpad sonic output, causing a speaker to generate a speaker sonic output. In some examples, the speaker sonic output substantially matches the target trackpad sonic output, advantageously providing a user with a familiar audible cue that is easily associated with the target trackpad sonic output. With reference now to FIG. 5B, in some examples and at 240 method 200 includes wherein the speaker is integrated in the computing device. In the present example, speakers 111 of computing device 100 can be utilized to supplement or replace the trackpad sonic output generally provided by the haptic actuator 124 in trackpad 120.

In other examples and at 244 method 200 includes wherein the speaker is a separate component from the computing device. In these examples, a speaker from another, separate device can be utilized in addition to or instead of the speakers 111 of computing device 100 to supplement or replace the trackpad sonic output generally provided by the haptic actuator 124 in trackpad 120. With reference again to FIG. 1, in this example a wireless speaker 122 is communicatively coupled to computing device 100, such as via the Bluetooth protocol. In these examples, the wireless speaker 122 can be utilized to generate speaker sonic output that supplements or replaces the trackpad sonic output generally provided by the haptic actuator 124 in trackpad 120. In other examples a variety of other speakers and/or computing devices incorporating speakers can be utilized, including but not limited to mobile phones, headphones, gaming devices, mobile computing devices, and wearable computing devices.

In some examples and at 248 method 200 includes determining that the determined sonic variance indicates a malfunctioning of the haptic actuator. At 252 method 200 includes, based at least on determining that the determined sonic variance indicates a malfunctioning of the haptic actuator, causing a speaker to generate the speaker sonic output. For example, a predetermined minimum decibel level can be stored in trackpad memory 128. The predetermined minimum decibel level can be selected to correspond to a decibel level of the trackpad sonic output below which there is a likelihood that the haptic actuator 124 is malfunctioning (due to damage, component wear, etc.).

When the decibel level of the trackpad sonic output generated by the haptic actuator 124 is determined to be below the predetermined minimum decibel level, the haptic calibration algorithms 134 cause one or more speakers to generate speaker sonic output. As noted above and in different examples, speakers 111 of computing device 100 and/or speaker(s) in other, separate devices can be utilized to generate the speaker sonic output. Advantageously, in these examples generating sonic output from the speakers can supplement or replace the trackpad sonic output generally provided by the haptic actuator 124 in trackpad 120.

In other examples, other aspects, waveform characteristics, and/or other features of the trackpad sonic output can be measured to determine a likelihood that the haptic actuator is malfunctioning. For example, one or more ranges of frequencies of the trackpad sonic output can be associated with a likely malfunctioning of the haptic actuator. When the frequency of the trackpad sonic output generated by the haptic actuator 124 is determined to fall within such a predetermined range of frequencies, thereby indicating potential haptic actuator malfunction, the haptic calibration algorithms 134 can cause one or more speakers to generate speaker sonic output.

In some examples and as noted above, haptic actuators in other devices can be utilized to generate haptic device output. With reference again to FIG. 5B, at 256 method 200 includes, based at least on the determined sonic variance, causing a second haptic actuator in another device separate from the computing device to generate a separate device haptic output. For example and with reference to FIG. 1, in this example a gaming controller 126 that includes a haptic actuator is communicatively coupled to computing device 100, such as via the Bluetooth protocol. In these examples, the haptic actuator in the gaming controller 126 can be utilized to generate separate device haptic output that supplements or replaces the trackpad's haptic output generally provided by the haptic actuator 124 in trackpad 120. In other examples a variety of other electronic devices incorporating a haptic actuator can be utilized, including but not limited to mobile phones, mice, styli, and wearable computing devices.

With reference again to FIG. 5B, at 260 method 200 includes wherein adjusting the driving signal for the haptic actuator comprises adjusting at least one characteristic selected from a frequency, amplitude, and duty cycle of the driving signal. In different examples, the frequency, amplitude, and/or duty cycle of the driving signal can be adjusted to adjust the driving signal for the haptic actuator. Advantageously, by selectively utilizing and adjusting one or a combination of these features of the driving signal for the haptic actuator, the computing device 100 can leverage a variety of parameters to calibrate the trackpad sonic output to substantially match the target trackpad sonic output.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
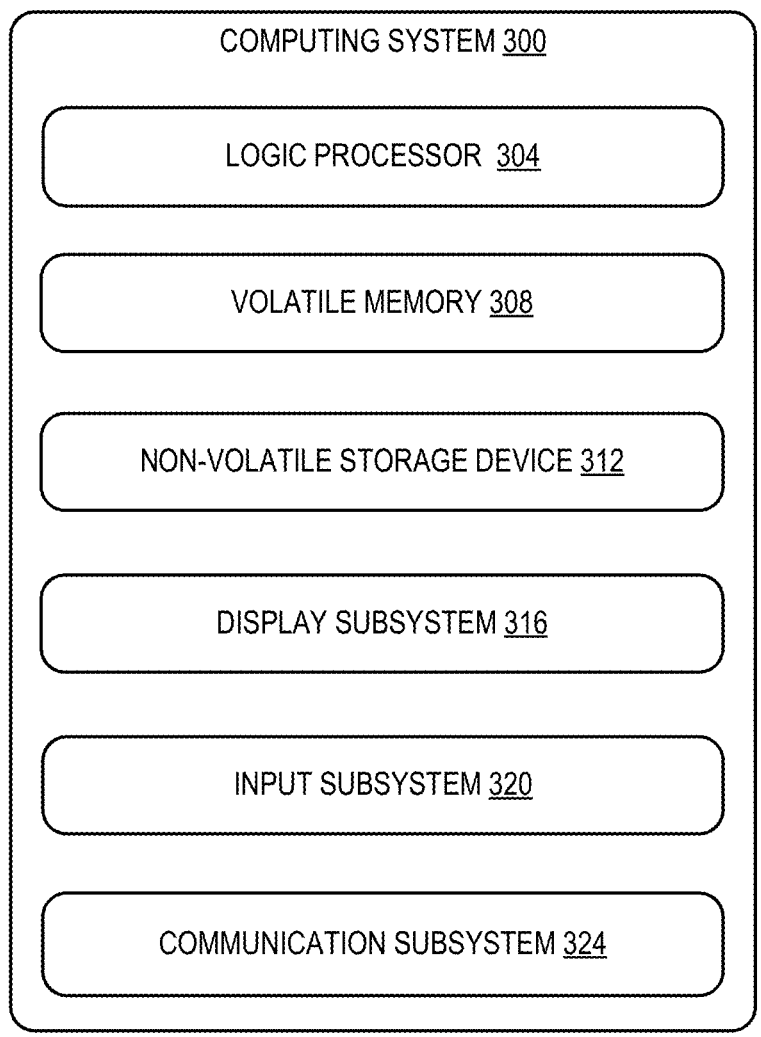
FIG. 6 shows a block diagram of an example computing system according to examples of the present disclosure.

FIG. 6 schematically shows a simplified representation of a computing system 300 configured to provide any to all of the compute functionality described herein. Computing system 300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. The computing device 100 described above may comprise computing system 300 or one or more aspects of computing system 300.

Computing system 300 includes a logic processor 304, volatile memory 308, and a non-volatile storage device 312. Computing system 300 may optionally include a display subsystem 316, input subsystem 320, communication subsystem 324, and/or other components not shown in FIG. 6.

Logic processor 304 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 304 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 304 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 312 includes one or more physical devices configured to hold instructions executable by the logic processors to implement the methods and processes described herein. When such methods and processes are implemented, the state of non-volatile storage device 312 may be transformed—e.g., to hold different data.

Non-volatile storage device 312 may include physical devices that are removable and/or built-in. Non-volatile storage device 312 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 312 may include nonvolatile, dynamic, static, read/write, read-only, sequential-access, location-addressable, file-addressable, and/or content-addressable devices. It will be appreciated that non-volatile storage device 312 is configured to hold instructions even when power is cut to the non-volatile storage device 312.

Volatile memory 308 may include physical devices that include random access memory. Volatile memory 308 is typically utilized by logic processor 304 to temporarily store information during processing of software instructions. It will be appreciated that volatile memory 308 typically does not continue to store instructions when power is cut to the volatile memory 308.

Aspects of logic processor 304, volatile memory 308, and non-volatile storage device 312 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), microcontroller units (MCUs), and complex programmable logic devices (CPLDs), for example.

When included, display subsystem 316 may be used to present a visual representation of data held by non-volatile storage device 312. As the herein described methods and processes change the data held by the non-volatile storage device, and thus transform the state of the non-volatile storage device, the state of display subsystem 316 may likewise be transformed to visually represent changes in the underlying data. Display subsystem 316 may include one or more display devices utilizing virtually any type of technology. Such display devices may be combined with logic processor 304, volatile memory 308, and/or non-volatile storage device 312 in a shared enclosure, or such display devices may be peripheral display devices.

When included, input subsystem 320 may comprise or interface with one or more user-input devices such as a stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 324 may be configured to communicatively couple various computing devices described herein with each other, and with other devices. Communication subsystem 324 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing device, comprising: a microphone; a trackpad; a haptic actuator coupled to the trackpad; a processor; and a memory storing instructions executable by the processor to: drive the haptic actuator with a driving signal to generate a first trackpad sonic output; measure the first trackpad sonic output using a signal from the microphone of the computing device; determine a sonic variance by comparing the first trackpad sonic output to a target trackpad sonic output; use the sonic variance to adjust the driving signal for the haptic actuator to an adjusted driving signal; and drive the haptic actuator with the adjusted driving signal to cause a second trackpad sonic output from the trackpad different from the first trackpad sonic output. The computing device may additionally or alternatively include, wherein the instructions are executable to, based at least in part on the determined sonic variance, cause a speaker to generate a speaker sonic output. The computing device may additionally or alternatively include, wherein the instructions are executable to: determine that the determined sonic variance indicates a malfunctioning of the haptic actuator; and based at least in part on determining that the determined sonic variance indicates a malfunctioning of the haptic actuator, cause the speaker to generate the speaker sonic output. The computing device may additionally or alternatively include, wherein the speaker is integrated in the computing device. The computing device may additionally or alternatively include, wherein the speaker is a separate component from the computing device. The computing device may additionally or alternatively include, wherein the haptic actuator is a first haptic actuator, and the instructions are executable to, based at least in part on the determined sonic variance, cause a second haptic actuator in another device separate from the computing device to generate a separate device haptic output. The computing device may additionally or alternatively include, wherein the instructions are executable to: determine that a trigger event has occurred; and based at least in part on determining that the trigger event has occurred, drive the haptic actuator with the driving signal to generate the first trackpad sonic output. The computing device may additionally or alternatively include, wherein the trigger event comprises determining that a user is not touching the trackpad and/or determining that a current time of day is within a predetermined calibration timeframe. The computing device may additionally or alternatively include, wherein adjusting the driving signal for the haptic actuator comprises adjusting at least one characteristic selected from a frequency, amplitude, and duty cycle of the driving signal.

Another aspect provides a method for adjusting a driving signal for a haptic trackpad in a computing device comprising a microphone, the method comprising: driving the haptic actuator with the driving signal to generate a first trackpad sonic output; measuring the first trackpad sonic output using a signal from the microphone of the computing device; determining a sonic variance by comparing the first trackpad sonic output to a target trackpad sonic output; using the sonic variance to adjust the driving signal for the haptic actuator to an adjusted driving signal; and driving the haptic actuator with the adjusted driving signal to cause a second trackpad sonic output from the trackpad different from the first trackpad sonic output. The method may additionally or alternatively include, based at least in part on the determined sonic variance, causing a speaker to generate a speaker sonic output. The method may additionally or alternatively include determining that the determined sonic variance indicates a malfunctioning of the haptic actuator; and based at least in part on determining that the determined sonic variance indicates a malfunctioning of the haptic actuator, causing the speaker to generate the speaker sonic output. The method may additionally or alternatively include, wherein the speaker is integrated in the computing device. The method may additionally or alternatively include, wherein the speaker is a separate component from the computing device. The method may additionally or alternatively include, wherein the haptic actuator is a first haptic actuator, the method further comprising, based at least on the determined sonic variance, causing a second haptic actuator in another device separate from the computing device to generate a separate device haptic output. The method may additionally or alternatively include determining that a trigger event has occurred; and based at least in part on determining that the trigger event has occurred, driving the haptic actuator with the driving signal to generate the first trackpad sonic output. The method may additionally or alternatively include, wherein the trigger event comprises determining that a user is not touching the trackpad and/or determining that a current time of day is within a predetermined calibration timeframe. The method may additionally or alternatively include, wherein adjusting the driving signal for the haptic actuator comprises adjusting at least one characteristic selected from a frequency, amplitude, and duty cycle of the driving signal.

Another aspect provides a computing device, comprising: a microphone; a trackpad; a haptic actuator coupled to the trackpad; a processor; and a memory storing instructions executable by the processor to: drive the haptic actuator with a driving signal to generate a first trackpad sonic output; measure the first trackpad sonic output using a signal from the microphone of the computing device; determine a sonic variance by comparing the first trackpad sonic output to a target trackpad sonic output; and based at least on the determined sonic variance, cause a second haptic actuator in another device separate from the computing device to generate a separate device haptic output. The computing device may additionally or alternative include, wherein the instructions are executable to: determine that a trigger event has occurred; and based at least in part on determining that the trigger event has occurred, cause the second haptic actuator in the another device separate from the computing device to generate the separate device haptic output.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The phrase "at least one <category> selected from," when used with a list of items, means different combinations of one or more of the listed items can be used. In other words, "at least one <category> selected from" means any combination of items may be used from the list, but not all of the items in the list are required. For example, without limitation, "at least one direction selected from North, South, and East" includes: only North, only South, only East, North and South, South and East, and North, South, and East. Of course, any combination of these items can be present.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a microphone;
a trackpad;
a haptic actuator coupled to the trackpad;
a processor; and
a memory storing instructions executable by the processor to:
   drive the haptic actuator with a driving signal to generate a first trackpad sonic output;
   measure the first trackpad sonic output using a signal from the microphone of the computing device;
   determine a sonic variance by comparing the first trackpad sonic output to a target trackpad sonic output;
   use the sonic variance to adjust the driving signal for the haptic actuator to an adjusted driving signal; and
   drive the haptic actuator with the adjusted driving signal to cause a second trackpad sonic output from the trackpad different from the first trackpad sonic output.

2. The computing device of claim 1, wherein the instructions are executable to, based at least in part on the determined sonic variance, cause a speaker to generate a speaker sonic output.

3. The computing device of claim 2, wherein the instructions are executable to:
   determine that the determined sonic variance indicates a malfunctioning of the haptic actuator; and
   based at least in part on determining that the determined sonic variance indicates a malfunctioning of the haptic actuator, cause the speaker to generate the speaker sonic output.

4. The computing device of claim 2, wherein the speaker is integrated in the computing device.

5. The computing device of claim 2, wherein the speaker is a separate component from the computing device.

6. The computing device of claim 1, wherein the haptic actuator is a first haptic actuator, and the instructions are executable to, based at least in part on the determined sonic variance, cause a second haptic actuator in another device separate from the computing device to generate a separate device haptic output.

7. The computing device of claim 1, wherein the instructions are executable to:
   determine that a trigger event has occurred; and
   based at least in part on determining that the trigger event has occurred, drive the haptic actuator with the driving signal to generate the first trackpad sonic output.

8. The computing device of claim 7, wherein the trigger event comprises determining that a user is not touching the trackpad and/or determining that a current time of day is within a predetermined calibration timeframe.

9. The computing device of claim 1, wherein adjusting the driving signal for the haptic actuator comprises adjusting at least one characteristic selected from a frequency, amplitude, and duty cycle of the driving signal.

10. A method for adjusting a driving signal for a haptic trackpad in a computing device comprising a microphone, the method comprising:
   driving the haptic actuator with the driving signal to generate a first trackpad sonic output;
   measuring the first trackpad sonic output using a signal from the microphone of the computing device;
   determining a sonic variance by comparing the first trackpad sonic output to a target trackpad sonic output;
   using the sonic variance to adjust the driving signal for the haptic actuator to an adjusted driving signal; and
   driving the haptic actuator with the adjusted driving signal to cause a second trackpad sonic output from the trackpad different from the first trackpad sonic output.

11. The method of claim 10, further comprising, based at least in part on the determined sonic variance, causing a speaker to generate a speaker sonic output.

12. The method of claim 11, further comprising:
   determining that the determined sonic variance indicates a malfunctioning of the haptic actuator; and
   based at least in part on determining that the determined sonic variance indicates a malfunctioning of the haptic actuator, causing the speaker to generate the speaker sonic output.

13. The method of claim 11, wherein the speaker is integrated in the computing device.

14. The method of claim 11, wherein the speaker is a separate component from the computing device.

15. The method of claim 10, wherein the haptic actuator is a first haptic actuator, the method further comprising, based at least on the determined sonic variance, causing a second haptic actuator in another device separate from the computing device to generate a separate device haptic output.

16. The method of claim 10, further comprising:
   determining that a trigger event has occurred; and
   based at least in part on determining that the trigger event has occurred, driving the haptic actuator with the driving signal to generate the first trackpad sonic output.

17. The method of claim 16, wherein the trigger event comprises determining that a user is not touching the trackpad and/or determining that a current time of day is within a predetermined calibration timeframe.

18. The method of claim 10, wherein adjusting the driving signal for the haptic actuator comprises adjusting at least one characteristic selected from a frequency, amplitude, and duty cycle of the driving signal.

19. A computing device, comprising:
   a microphone;
   a trackpad;
   a haptic actuator coupled to the trackpad;
   a processor; and
   a memory storing instructions executable by the processor to:
      drive the haptic actuator with a driving signal to generate a first trackpad sonic output;
      measure the first trackpad sonic output using a signal from the microphone of the computing device;
      determine a sonic variance by comparing the first trackpad sonic output to a target trackpad sonic output; and
      based at least on the determined sonic variance, cause a second haptic actuator in another device separate from the computing device to generate a separate device haptic output.

20. The computing device of claim 19, wherein the instructions are executable to:
   determine that a trigger event has occurred; and
   based at least in part on determining that the trigger event has occurred, cause the second haptic actuator in the another device separate from the computing device to generate the separate device haptic output.

* * * * *